Desorption Isotherms

Regenerating Characteristics

United States Patent Office 3,534,529
Patented Oct. 20, 1970

3,534,529
PROCESS FOR RECOVERING ORGANIC
VAPORS FROM AIRSTREAM
Manlio M. Mattia, Ridley Park, Pa., assignor to Day & Zimmermann, Inc., Philadelphia, Pa., a corporation of Maryland
Filed Oct. 27, 1969, Ser. No. 869,604
Int. Cl. B01d 53/04
U.S. Cl. 55—62      6 Claims

ABSTRACT OF THE DISCLOSURE

Organic vapors are removed from a vapor-laden airstream by adsorption on an adsorbent. When the adsorbent becomes saturated with organic material, it is removed from the adsorption cycle and regenerated by circulating hot air. A slip stream is forced through the regenerating air heater and then returned to the regenerating system. As the temperature of the regenerating gas rises, organic material is stripped from the adsorbent. The higher the regenerating temperature, the greater is the concentration of organic vapor in the airstream. At a predetermined regenerating temperature the slipstream in the regenerating system is isolated, cooled and forced through a secondary adsorber where its organic vapor is adsorbed and recovered.

---

This invention relates to a process for recovering organic vapors from an airstream, and more particularly to a process for recovering valuable contaminants, such as organic solvents from air, when such contaminants are present in a concentration that is too low to recover the contaminants economically by conventional adsorption systems.

A large part of industrial air pollution arises from the exhaustion of large volumes of air contaminated with organic vapors at very low concentrations to the atmosphere. An economical method of destroying these contaminants by incineration has been described in my U.S. Letters Patent 3,455,089 issued July 15, 1969 entitled: Process for Removing Organic Contaminants From Air.

It has proved to be most difficult to recover and retrieve the organic contaminants when they are present in low concentrations in air. Thus, known processes which recover organic vapors present in the air at low concentrations involve high investment and/or operating costs. In particular, in many known processes, the excessive amounts of steam required to regenerate the adsorbent prohibits economic recovery of organic contaminant from organic vapor-laden air.

This invention has as an object the economic recovery of valuable organic vapor contaminant from air.

This invention has as another object the economic recovery of valuable organic contaminant which is present in very low concentrations in an airstream.

Other objects will appear hereinafter.

For the purpose of illustrating the invention there is shown in the drawings a form which is presently preferred; it being understood, however, that this invention is not limited to the precise arrangements and instrumentalities shown.

Figure 1:
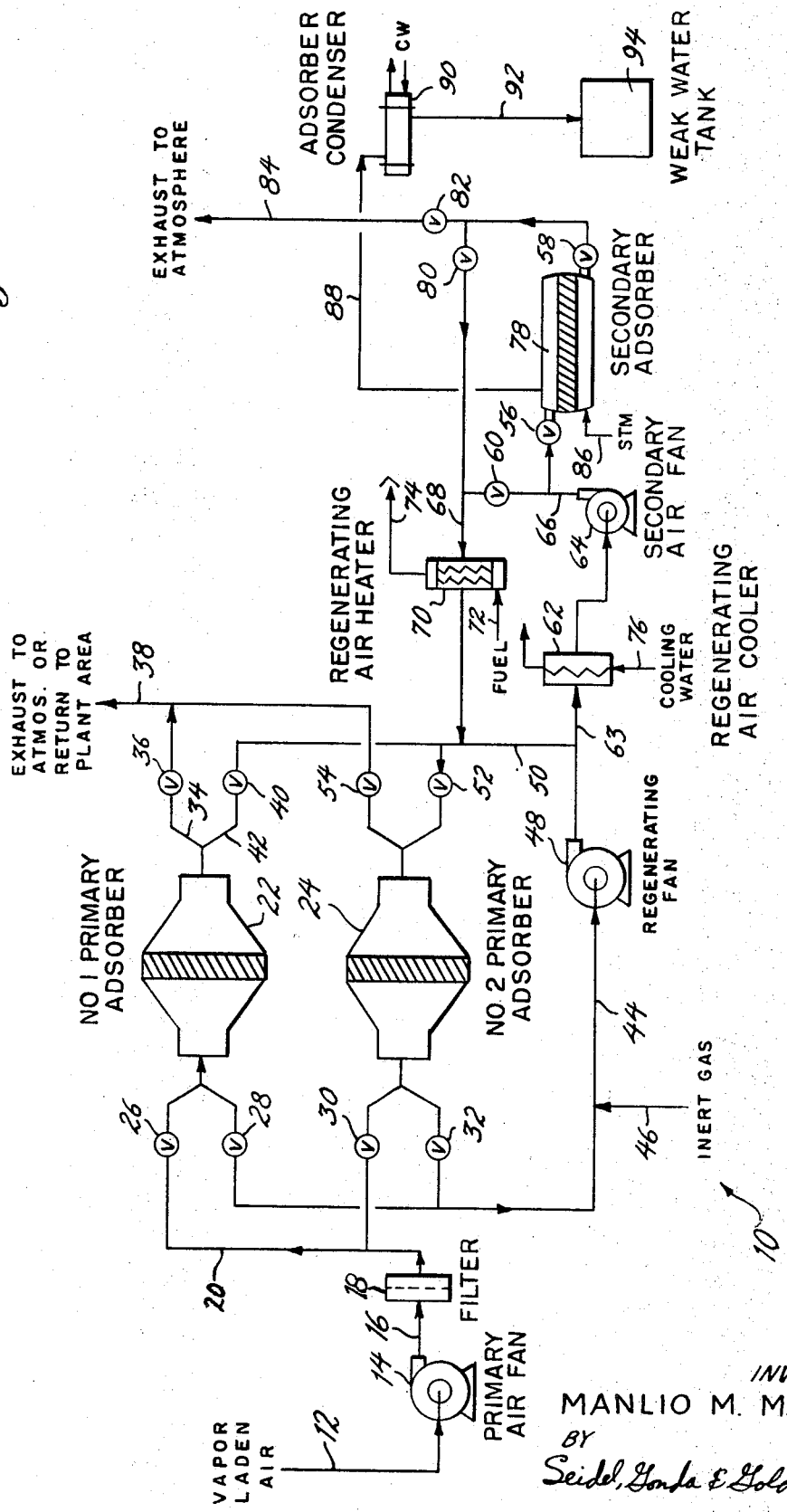
FIG. 1 is a diagrammatic flow sheet of the process of the present invention.

Referring to FIG. 1, the organic vapor recovery system of the present invention is designated generally as 10. Contaminated air, namely air which contains organic vapor contaminant is introduced into the system from line 12. For the purposes of illustration, the organic contaminant is acetone.

The vapor laden air is passed through primary air fan 14, line 16, filter 18, and into line 20. Line 20 is in communication with the two primary adsorbers 22 and 24.

The primary adsorbers 22 and 24 may use any conventional adsorbent such as activated carbon (charcoal) or silica gel, and may be any of a wide variety of suitable constructions. By way of example, the adsorbent may be disposed as a fixed bed, or as a moving bed.

While only two primary adsorbers are shown in the system 10 of FIG. 1, it is to be understood that a larger number of such adsorbers may be used, where desired.

For the purpose of illustration, initially primary adsorber 22 is on-stream, namely adsorbing the organic vapor (acetone vapor in the subject example) from the airstream, and primary adsorber 24 is being regenerated. Hence, valve 26 is open and valve 28 is closed, while valve 30 is closed and valve 32 is open.

Primary adsorber 22 is exhausting to the atmosphere through line 34, valve 36, which is open, and line 38. Alternatively, the air from which the organic contaminant has been removed may be returned to the plant area from which the vapor laden air in line 12 has been withdrawn. Valve 40 in line 42 is closed.

Primary adsorber 24 is regenerated by recirculating air in line 44. Such recirculating air may also include an inert gas, which is introduced into the line 44 from line 46. As will be more fully set forth below, it is not always necessary to introduce an inert gas into the recirculating air, which functions as the regenerating gas, in line 44, although in some cases when a fire hazard may be present (see below), it is essential that inert gas be introduced into the recirculating air in line 44.

The regenerating gas in line 44 is passed through a regenerating fan 48, line 50, and valve 52, which is open. From valve 52 it enters the primary adsorber 24 which is undergoing regeneration. Valve 54 in line 38 is closed.

Initially, valves 56 and 58 are closed, and valve 60 is open. Moreover, initially, no cooling water is passed through the regenerating air cooler 62 in line 63.

The regenerating gas from line 44 is divided into two streams. A major portion is recycled directly through line 50 and valve 52 to the primary adsorber 24. A slipstream, namely a minor portion of the regenerating gas is passed through line 63, secondary air fan 64, line 66, and into line 68.

In line 68 the slipstream portion of the regenerating gas is passed in heat exchange relationship through regenerating air heater 70. Regenerating air heater 70 is heated by fuel from line 72 which is exhausted through line 74. From line 68 the heated slipstream rejoins the regenerating gas in line 50 and is passed to primary adsorber 24.

After a predetermined temperature has been reached, cooling water is introduced into the regenerating air cooler 62 through line 76. Valves 56 and 58 are opened and valve 60 is closed.

It will be seen that the slipstream from line 63 now moves in heat-exchange relationship with the cooling water in regenerating air cooler 62, through the secondary air fan 64, line 66, valve 56, and into the secondary adsorber 78. From the secondary adsorber 78 the slipstream recirculates through valve 58, valve 80, line 68, regenerating air heater 70 into line 50. Alternatively, if desired, valve 82 may be opened, and the desorbed slipstream, or a portion thereof, exhausted to the atmosphere through line 84.

The secondary adsorber 58 need only be a fraction of the size of either of the primary adsorbers 22 and 24. The composition of the adsorbent in the secondary adsorber 78 may be the same as that of the primary adsorbers 22 and 24.

When the adsorbent in secondary adsorber has adsorbed a predetermined level of the organic contaminant (acetone), the same is stripped from the secondary adsorber 78 by steam introduced into the secondary adsorber 78 from line 86. The mixture of organic material and water passes overhead through line 88, and is condensed in adsorber condenser 90. From adsorber condenser 90 the mixture goes through line 92 to weak water tank 94. In the subject example, where the organic contaminant is acetone, which is completely miscible with water, no separation occurs in the weak water tank 94. Conventional methods for removing acetone from water may then be employed. Where the organic contaminant is not miscible with water, separation may be achieved following the adsorber condenser 90 by layering.

In the process of the present invention, the concentration of adsorbate in the secondary adsorber 78 is much higher than that in the regenerating primary adsorber bed 24. Thus, the amount of adsorbate in heated gas in the regenerating system is many times that of the original contaminated vapor laden air entering the system 10 through line 12.

The relatively small size of secondary adsorber 78, and the relatively high concentration of adsorbate per unit weight of adsorbent within the secondary adsorber 78 permits relatively small amounts of steam to be used to effect stripping. Thus, whereas it would be uneconomical to effect steam stripping in the regenerating primary adsorber 24 due to the high steam requirements, much lower quantities of steam are required to effect stripping of adsorbate from the secondary adsorber 78.

Moreover, due to the requirement of steam stripping, the secondary adsorber 78 is preferably constructed of relatively exotic material. The use of such relatively exotic material (to avoid corrosion) is not required with the primary adsorbers 22 and 24, which do not undergo steam stripping. Only one secondary adsorber 78 is required since both adsorption and regeneration can be accomplished within each cycle change of the primary adsorbers 22 and 24.

While the secondary adsorber 78 is regenerating, the primary adsorber 24 is cooled by the regenerating air cooler 62. Thus, the secondary air fan 64 draws air from the primary regenerating system through the cooler 62 and forces it through valve 60 back into adsorber 24. The regenerating air heater 70 is not in service at this time.

After primary adsorber 24 has been regenerated, valves 32 and 52 may be closed and valves 30 and 54 may be opened whereby the primary adsorber 24 is placed onstream. The primary adsorber 22 may be regenerated by closing valves 26 and 36 and opening valves 28 and 40.

By way of example, in order to treat 200,000 cubic feet per minute of air containing 200 parts per million of acetone, two primary adsorbers are required, one adsorbing while the other is being regenerated. Each primary adsorber contains 33,000 pounds of activated carbon, and each adsorbs for two hours before being regenerated. The carbon bed depth for this system is 6½ inches in each primary adsorber. The primary adsorbers operate with a carbon loading of 3.6 pounds of acetone per 100 pounds of carbon for the saturated condition and 1.5 pounds of acetone per 100 pounds of carbon for the regenerated condition. The flow rate to the secondary adsorber is 10,000 cubic feet per minute, and the maximum regenerating temperature is 300° F.

The secondary adsorber 78 contains 7000 pounds of activated carbon and operates with a net carbon loading of 10 pounds of acetone per 100 pounds of carbon.

About 2500 pounds of steam are required to regenerate the activated carbon in the secondary adsorber 78.

Figure 2:
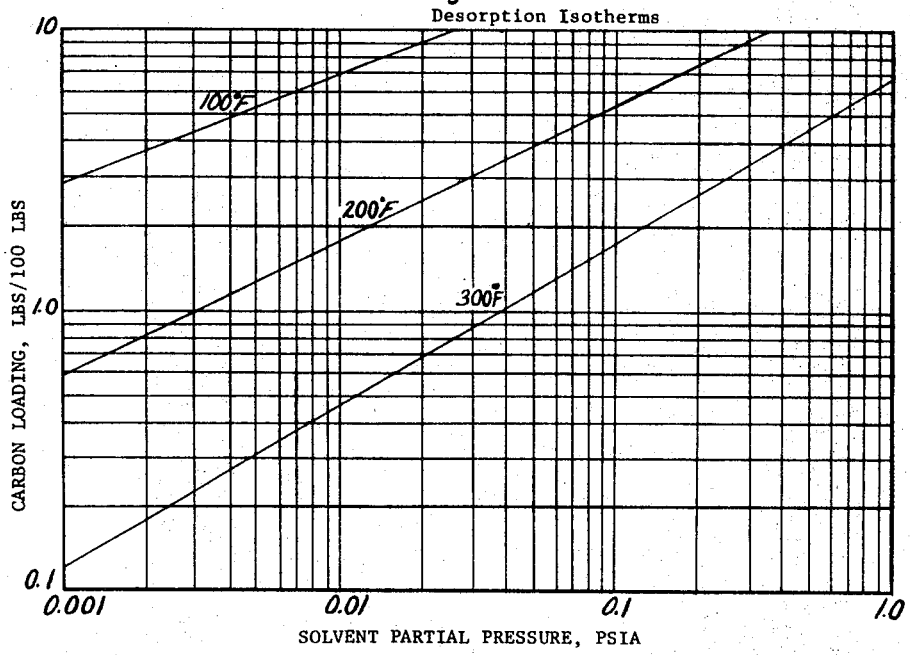
FIG. 2 is a graphical desorption isotherm for acetone illustrating the effect of increasing temperature.

FIG. 2 represents the desorption isotherm for acetone.

Figure 3:
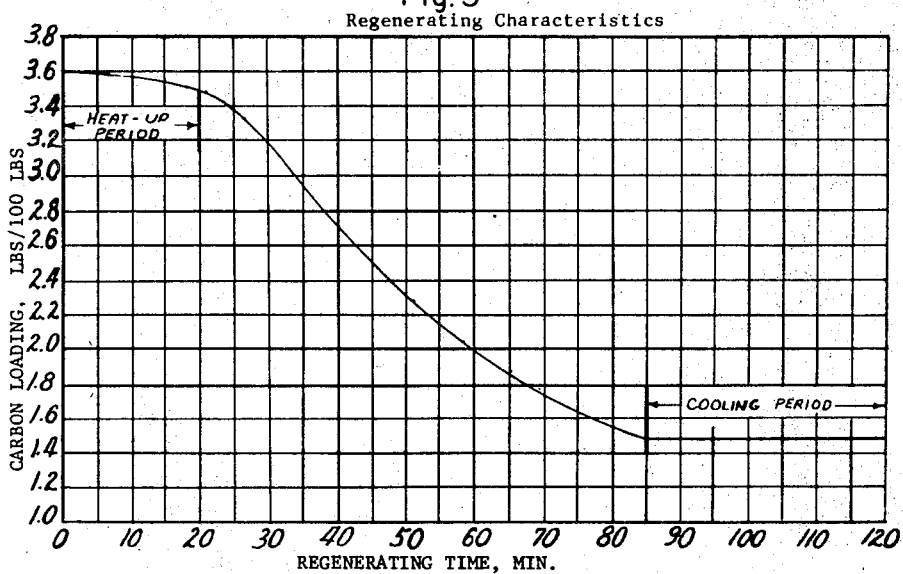
FIG. 3 illustrates graphically a typical regenerating cycle in terms of carbon loading when acetone is adsorbed on a charcoal adsorbent plotted against regenerating time.

FIG. 3 illustrates the regenerating characteristics for the primary adsorption system, when the flow rate to secondary adsorber 78 is 10,000 cubic feet per minute and the maximum regenerating temperature is 300° F., with the regenerating air cooler 62 cooling the slipstream in line 63 to 100° F.

It is manifest from the foregoing that the subject process permits a multifold increase, such as the order of 300 to 500 percent in carbon loading in the secondary adsorber 78 over the regenerating primary adsorber 24 for the conditions stated.

From FIG. 2, it is seen that 85 minutes is required to complete regeneration to a carbon loading of 1.5 pounds of acetone per 100 pounds of carbon. The remaining 35 minutes in the two hour cycle is used for cooling the activated carbon bed.

While the process has been described using air as the regenerating gas, the subject invention contemplates the usage of an inert gas, such as nitrogen or carbon dioxide. In addition, the subject invention contemplates the use of a regenerating gas comprising a mixture of air and an inert gas. The inert gas may be introduced through line 46 as has heretofore been described. The inert gas exhausted from the regenerating air heater 70 by way of line 74 may be the source of the inert gas supplied through line 46. The usage of an inert gas as the regenerating gas, or as a part of the regenerating gas, is particularly necessary when the organic contaminant is one whose fire point temperature is sufficiently low that a fire hazard is presented by the increase in temperature of the regenerating adsorbent bed during the regeneration cycle.

The present invention may be embodied in other specific forms without departing from the spirit or essential attributes thereof.

I claim:

1. A process for removing organic vapor contaminant from contaminated air and recovering said organic contaminant which includes contacting said contaminated air with an adsorbent material disposed in a primary adsorber bed to adsorb contaminant from said air upon said adsorbent material, periodically regenerating said contaminant by stripping adsorbed contaminant from said secondating gas through said primary adsorber and adsorbent material so as to drive off the contaminant and to yield a contaminant-enriched regenerating gas mixture, drawing off a portion of said contaminant-enriched regenerating gas mixture, cooling said drawn-off portion of said contaminant-enriched regenerating gas mixture, adsorbing contaminant from said cooled drawn-off portion of regenerating gas on an adsorbent material disposed in a secondary adsorber bed, and recovering organic contaminant by stripping adsorbed contaminant from said secondary adsorber bed adsorbent material.

2. A process in accordance with claim 1 wherein the hot regenerating gas is recycled through the contaminant-bearing adsorbent material disposed in the primary adsorber bed prior to a portion thereof being drawn off and cooled.

3. A process in accordance with claim 1 in which the concentration of contaminant per unit weight on the adsorbent material disposed in the secondary adsorber bed prior to the stripping of adsorbed contaminant therefrom is greater than the maximum concentration of adsorbed contaminant in the primary adsorber bed per unit weight of bed.

4. A process in accordance with claim 1 wherein the hot regeneration gas is air.

5. A process in accordance with claim 1 wherein the hot regeneration gas is an inert gas.

6. A process in accordance with claim 1 wherein the hot regeneration gas is a mixture of air and an inert gas.

References Cited

UNITED STATES PATENTS

| | | | |
|---|---|---|---|
| 3,137,549 | 6/1964 | Kilgore et al. | 55—62 |
| 3,405,507 | 10/1968 | Spencer et al. | 55—62 |
| 3,455,089 | 7/1969 | Mattia | 55—62 |
| 3,479,797 | 11/1969 | Spencer et al. | 55—62 |

REUBEN FRIEDMAN, Primary Examiner

C. N. HART, Assistant Examiner

U.S. Cl. X.R.

55—74, 180